Aug. 12, 1969 T. J. DALEY 3,461,388

PHASE LOCKED LOOP RECEIVER

Filed Nov. 25, 1966

INVENTOR.
TIMOTHY JOSEPH DALEY

BY M. L. Kaclun ATTY.

United States Patent Office 3,461,388
Patented Aug. 12, 1969

3,461,388
PHASE LOCKED LOOP RECEIVER

Timothy Joseph Daley, Fairport, N.Y., assignor to General Dynamics Corporation, a corporation of Delaware Filed Nov. 25, 1966, Ser. No. 597,017
Int. Cl. H04b 1/16
U.S. Cl. 325—421 9 Claims

ABSTRACT OF THE DISCLOSURE

A phase locked loop receiver is described which is adapted to receive an input signal which includes an input carrier having side tones which may contain range, velocity and telemetry information. The phase locked loop is designed to track the input carrier, notwithstanding that the carrier may change in frequency because of Doppler effects, and provides an output signal which is phase coherent with the input carrier. The loop contains filters and frequency translating stages which restrict the response of the loop to progressively narrower band widths whereby noise and signal perturbations are prevented from interferring with the maintenance of phase lock even though the carrier level may be below the noise level. The output signal from the loop and the input signal are applied to a phase detector which demodulates the input signal and makes available for further demodulation of the side tone signals.

Figures 1, 2:
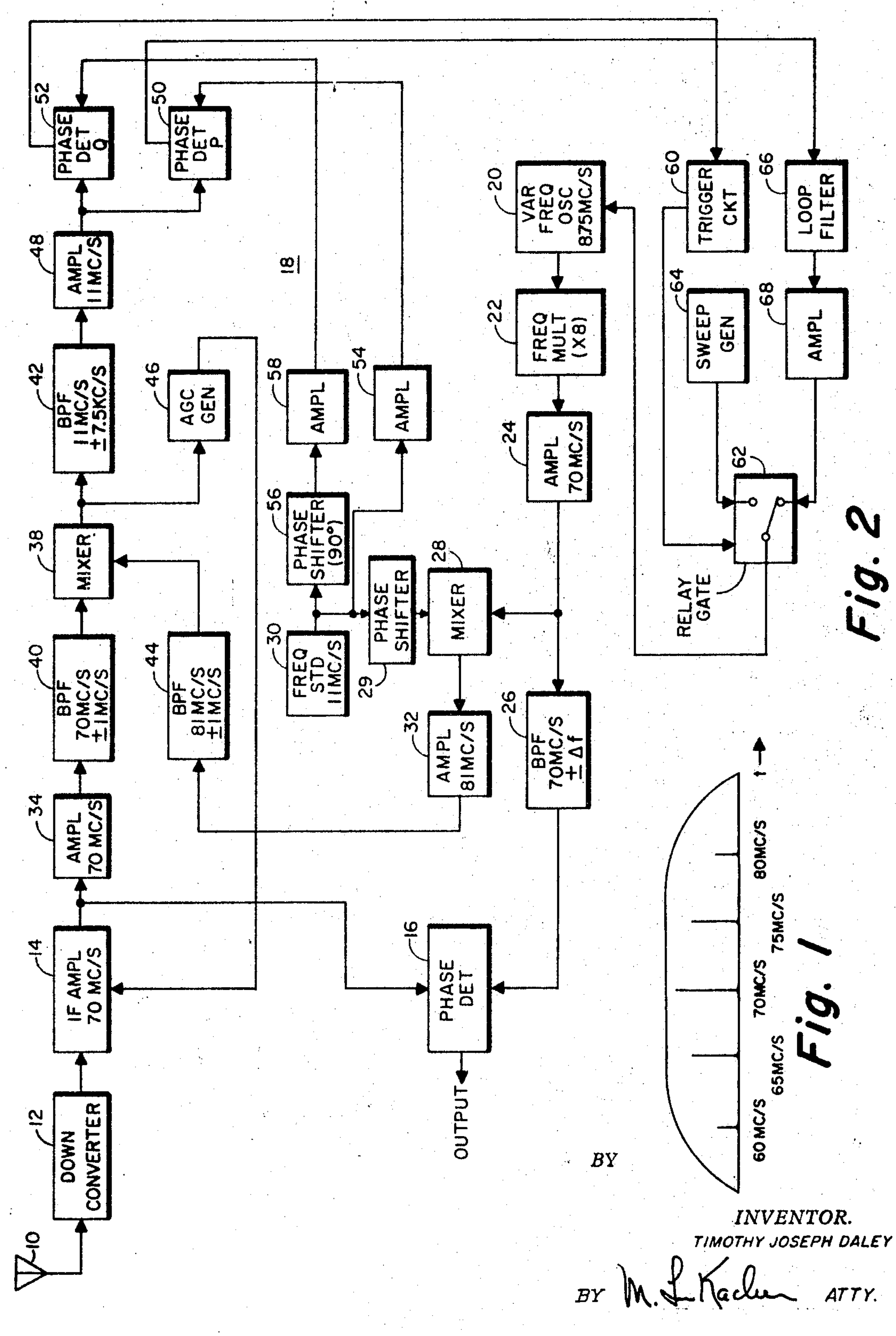

The present invention relates to an improved phase locked loop receiver for receiving signals containing telemetry and/or tracking information from space vehicles such as satellites, missiles and the like. The invention is particularly applicable to a wide band Doppler tracking phase demodulator system which may form a part of such phase locked loop receivers. The invention described herein was made in the performance of work under a NASA contract and is subject to the provisions of section 305 of the National Aeronautics and Space Act of 1958, Public Law 85-568 (72 Stat. 435; 42 U.S.C. 2457).

Although the invention is especially suitable for use in receivers for tracking signals which may be transmitted from space vehicles. the invention is generally useful in systems wherein a signal which is phase coherent with an input carrier is desired, as in signal analyzers and data modems which utilize phase demodulators.

It is often necessary to transmit sideband signals in noisy environments and to recover information contained in such signals, notwithstanding that the signal-to-noise levels may be low. Discrimination between signals and noise may be accomplished on the basis of frequency and phase comparison. Thus, by extracting a component or tone within the signal frequency band, it may be possible to limit the effects of ambient noise. This component may be a carrier frequency, and the other components within the band may be tones which modulate that carrier or which are transmitted in a manner to be coherent therewith. By recovering the carrier and using the carrier to demodulate the tones, the transmitted information may be received. The recovery of the carrier out of the noisy environment in which it is contained is, however, a significant problem. This problem is even more complicated if the signal components which accompany the carrier are not significantly lower in frequency than the carrier. In a specific case, for example, where the information tone frequency is of the order of ten percent of the frequency of the carrier, conventional signal handling techniques for recovering the carrier would result in the loss of the information contained in the tone.

Accordingly, it is an object of the present invention to provide an improved receiver which tracks and demodulates a signal, notwithstanding that the signal-to-noise ratio may be very low and notwithstanding that the tones of interest in the signal are close to each other in frequency.

It is a further object of the present invention to provide an improved phase locked receiver which is capable of recovering a tone which is phase coherent with a received input signal in the presence of noise.

It is a still further object of the present invention to provide an improved wideband phase demodulator which is capable of recovering a reference phase signal, notwithstanding frequency shifts in the received reference phase signal or its low signal-to-noise ratio.

It is a still further object of the present invention to provide an improved receiver which tracks a carrier, regardless of wide Doppler frequency changes therein and notwithstanding that information tones may be close in frequency to the frequency of the carrier and utilizes the carrier to demodulate such tones.

Briefly described, a receiver embodying the invention may receive an input signal including a carrier frequency tone and a plurality of side tones, some of which may have frequencies relatively near the carrier frequency. In other words, when the bandwidth to carrier frequency ratio is relatively high, the input signals may be subject to Doppler frequency shifts of a magnitude which are significant compared to the frequency of the carrier (say approximately one percent of the carrier frequency). A phase locked loop which receives the input signals recovers the carrier and applies it together with the received input signals to a demodulator which recovers the information tones. The phase locked loop contains a variable frequency oscillator (VFO) and associated circuits for generating a signal which is of the same frequency as the carrier.

The loop also contains a phase detector which generates an error signal for controlling the frequency and phase of the VFO signal so that it is coherent with the received carrier frequency tone and can supply the recovered carrier. The loop also includes means for applying control and reference signals to the phase detector on the basis of which the error signals can be generated. Specifically, a frequency standard provides the reference signals, and the control signal applying means may include first and second frequency translators and first and second bandpass filters, each having a passband sufficient to pass the expected Doppler shift and also having phase response characteristics which are matched to each other. The recovered carrier and the reference signals are applied to the second mixer and passed through the second filter to the first mixer. The input signals are passed through the first filter and then applied to the first mixer. The first mixer output at the same frequency as the reference signal is applied to the phase detector as the control signals. By the generation of the control signals in the manner described above, the loop excludes noise without interference with the side tones while tracking the variation in carrier frequency due to Doppler.

The invention itself, both as to its organization and method of operation, as well as additional objects and advantages thereof will become more readily apparent from a reading of the following description in connection with the accompanying drawings in which:

FIGURE 1 is a graph showing the spectrum of the input signals to a receiver which embodies the invention; and FIGURE 2 is a simplified block diagram of the receiver embodying the invention.

Referring to FIGURE 1, there is shown the power spectrum of the intermediate frequency signal which is produced in the receiver, shown in FIGURE 2. The carrier input is shown as being a component centered around at 70 mc./s. In addition, there are numerous side tones, the highest frequency one of which is shown. These side tones have frequencies of 5 mc./s., 500 kc., 20 kc., and 4 kc. These are phase modulated on the carrier and therefore, the 5 mc./s. side tone appears at 65 mc./s. and 75 mc./s. and at 5 mg./s. steps spaced from the last-mentioned frequencies. These side tones are phase modulated in accordance with the range rate (velocity) of the transmitting vehicle because of Doppler and other effects, and, perhaps, also with telemetry inputs. Accordingly, they may be demodulated by comparing them with the carrier in a phase detector. It will be observed that the ratio of the carrier frequency to the sidetone frequency is relatively low (viz. 1:14). Moreover, the carrier may be subject to wide Doppler shifts, say ±600 kc./s. In order to track the carrier, it is therefore necessary to avoid the use of conventional superheterodyne techniques, say which would involve translating the input signal down to a lower intermediate frequency signal and detecting that signal, inasmuch as the lower frequency can be almost equal to the frequency of the information tones. A phase locked loop system which operates by comparing directly a 70 mc./s. VFO output with the input signal, filtered sufficiently to pass the carrier and its expected Doppler, is also unsatisfactory, since the dynamic response of a relizable phase detector is insufficient to accurately detect the carrier in the presence of such wideband noise (viz. the noise in the Doppler-wide filter).

Referring to FIGURE 2, an antenna 10 which may be a microwave antenna for receiving microwave signals (say at "C" band) from the transmitter in the space vehicle is coupled to a down converter 12 which converts the signal to an intermediate frequency. The center of this intermediate frequency is indicated as being 70 mc./s. The acquisition and tracking system for the antenna and the down converter 12 intermediate frequency band are not shown, inasmuch as they may be designed in accordance with conventional techniques. The intermediate frequency signal is a wide band signal. Accordingly, all of the ambient noise present in the space environment is contained in the intermediate frequency band. The problem remains therefore to recover the carrier, notwithstanding that it may be of low amplitude, well below the noise level.

The invention provides a phase locked loop which effectively has a 100 c.p.s. tracking bandwidth and excludes the noise to such an extent that the carrier may be recovered in spite of the overall low signal-to-noise ratio considering the entire intermediate frequency band.

Buffer and impedance translating amplifiers have been omitted in the drawing in order to simplify the illustration and for better exposition of the invention. It will be appreciated, of course, that buffer amplifiers may be used between mixers and filters in order to maintain proper signal levels and input/output impedance relationship therebetween.

The down converter 12 supplies the signals to an intermediate frequency amplifier 14 which may include voltage controlled attenuators which respond to gain control signals. These gain control signals are operative to provide a constant data output level, while accepting a high dynamic range input signal.

The output of the IF amplifier 14 is wide band and contains all of the side tones. This wide band signal is applied to a demodulator which takes the form of a phase detector 16. The synthesized carrier, which is phase coherent with the 70 mc./s. carrier, is applied to another input to the phase detector. The phase detector 16 supplies the output of the receiver, which may consist of sidetones or other narrow spectra information, as well as wideband noise, which may exceed the signal power in the wide video bandwidth. Further data demodulation including narrow band filtering may follow the receiver to extract range, range rate, telemetry or even communication signals.

The synthesized carrier which also tracks the Doppler frequency variations is generated by a phase locked loop 18. The loop includes a variable oscillator 20 which may be a voltage controlled crystal oscillator. The frequency output of this oscillator is indicated as being 8.75 mc./s. This signal is multiplied in a frequency multiplier 22 by eight to produce a 70 mc./s. signal which is amplified in buffer amplifier 24 and supplied to the phase detector 16 through a bandpass filter 26. The filter may be a single section filter which has a center frequency of 70 mc./s., and an adjustable bandwidth. The bandwidth is always sufficient to pass the Doppler frequency variation and is adjusted to correct for small phase shifts which may be introduced into the recovered carrier by reason of the circuits in the phase locked loop 18.

The error signal for controlling the VFO 20 is obtained by control and reference signals generating means in the loop 18. To generate the control signals, there are used translation means in the form of balanced mixer circuit 28 together with a reference signal from the output of a frequency standard 30 which may be a crystal oscillator, and which has an output frequency indicated as 11 mc./s. The frequency standard 30 and its associated circuit elements generate the reference signals. The reference signal is applied to the balance mixer 28 via a 360° adjustable phase shifter 29. The desired mixer 28 product is at 81 mc./s., which is amplified in amplifier 32 and selected by the 81 mc./s. bandpass filter 44. The balanced mixer 28 and filter are designed to reject the 70 mc./s. signal, as this signal would cause interference in the signal conversion mixer 38.

The signal conversion mixer 38 accepts the 70 mc./s. carrier input signal and the 81 mc./s. signal and produces an 11 mc./s. difference frequency. The signal conversion mixer 38 will be referred to hereinafter as the first mixer. The balanced mixer 28, which accepts the 70 mc./s. VFO and the 11 mc./s. reference signal to produce the 81 mc./s. signal will be referred to hereinafter as the second mixer. The input signal is applied to the first mixer 38 via a buffer amplifier 34 and a first bandpass filter 40. The filter 40 has a center frequency equal to the carrier frequency 70 mc./s. and the bandwidth wide enough to pass the expected Doppler shifts (viz. ±1 mc./s.). The 81 mc./s. signal is applied to the first mixer 38 through a second bandpass filter 44 which passes a center frequency of 81 mc./s. and has the same bandpass ±1 mc./s. as the first filter 40.

The filters 40 and 44 are desirably of a five-pole Butterworth design. The ±1 mc./s. bandwidth thereof is provided because the filters are 2 mc./s. wide between their 3 db points. The second filter 44 rejects the 70 mc./s. carrier component which is appled to the second mixer 28 as well as other undesired mixer products. The first filter 40 also rejects the image frequency which may be contained in the intermediate frequency band passed by the IF amplifier 14. The amplitude and phase response of the second filter 44 is desirably matched to the amplitude and phase response of the first filter 40 so that both inputs to the first mixer 38 undergo similar phase shifts with Doppler which will cancel in the course of translation in the first mixer 38. In this manner the coherent carrier, which is generated by the phase locked loop, will maintain the proper phase setting at the wide band phase demodulator 16, regardless of the Doppler frequency variation on the input carrier. The adjustable phase shifter 29 allows for the proper initial setting of the recovered carrier phase.

The responses of the filters will be properly matched if the slope of their phase shift vs. frequency characteristics are the same. This may be accomplished by using adjustable capacitors or inductors in the sections of the Butterworth filter. These adjustable elements are adjusted while viewing the amplitude vs. response frequency in both filters. When the amplitude response is matched, the phase response has been found also to be acceptably matched for both filters. Small differences are compensated in the final receiver alignment by adjusting the filter 26.

The difference product of the first mixer 38 (11 mc./s.) is now at a frequency compatible with phase detectors readily designed in accordance with the practical design techniques. In other words, while it is possible to design a phase detector, say of the diode type, which is capable of responding to a threshold signal (viz. discernible from the noise) which exists in a 100 c./s. bandwidth, the detection of such a signal over a 2 mc./s. bandwidth is not presently relizable. Accordingly, the use of phase tracked filters 40 and 44 permit the loop to produce a phase coherent signal which tracks the carrier with practical circuits.

The output of the first mixer 38 may be applied to an automatic gain control generator 46 which may be in the form of a diode peak detector having a threshold adjusted to pass noise peaks and to apply a level corresponding to those peaks to the attenuator circuits of the IF amplifier 14. Thus, noise peaks are not able to saturate the receiver prior to phase lock.

The output of the mixer 38 is passed through a bandpass filter 42 tuned to 11 mc./s. and having a bandpass of ±7.5 kc./s. sufficient to pass the carrier translated to 11 mc./s. The filter 42 output is applied through an amplifier 48 to a pair of phase detectors, indicated as the P-phase detector 50 and the Q-phase detector 52. The 11 mc./s. reference signal from the standard is applied to the P-phase detector 50 through an amplifier 54. The Q-phase detector 52 receives the reference signal shifted in phase 90° with respect to the signal applied to the P-phase detector. A phase shifter 56 and another amplifier 58 are provided for the latter purpose. The output of the P-phase detector 50 will be at null when the recovered carrier is phase locked to the input carrier. However, by virtue of the 90° phase shift, the output of the other phase detector 52 will be a maximum level at phase lock. These two phase detector outputs are utilized for different purposes in the system. The Q-phase detector output is used as an automatic gain control detector by application thereof to the AGC input of the IF amplifier 14, after phase lock is achieved, and as a lock-unlock indication, which is applied to trigger circuit 60. This circuit produces an output level when the Q-detector output is low. This level causes a relay gate 62 to switch the output of a sweep generator 64 to the input of the variable frequency oscillator 20, causing the oscillator 20 to sweep across the band until it reaches and locks to the input carrier. When lock occurs, the trigger circuit 60 causes the relay gate 62 to switch to the position indicated in the drawing. The output of the P-detector 50 is applied through the loop filter 66 which is a low pass RC filter (also known as a lag filter) and amplifier 68 to the input of the variable frequency oscillator 20, thereby providing an error voltage which maintains phase lock of the synthesized recovered carrier to the input carrier. The narrow bandwidth loop filter 66 effectively narrows the bandpass of the phase locked loop 18, say to a 100 c./s. bandwidth, so that the loop does not respond to noise outside of the immediate vicinity of the input carrier (70 mc./s.). Thus, the phase locked loop is capable of recovering and synthesizing the carrier in spite of noise and notwithstanding that the carrier frequency is near the side tone frequencies.

From the foregoing description, it will be apparent that there has been provided an improved phase locked loop receiver, having a wide band Doppler tracking phase demodulator which uses phase tracked filters. It will be apperciated, of course, that the system has been described in simplified form for the purpose of clarity of description and exposition of the invention. Accordingly, additions, variations and modifications of the hereindescribed system within the scope of the invention will become apparent to those skilled in the art. The description should therefore be taken as illustrative and not in any limiting sense.

What is claimed is:

1. A receiver for tracking input signals which are subject to shift in frequency and for providing an output signal which is phase coherent therewith, said system comprising (a) a variable frequency oscillator for producing said output signal, (b) a frequency standard producing reference signal, (c) a first mixer for producing a first output, (d) a second mixer responsive to said variable frequency oscillator output and said frequency standard output for producing a second output, (e) first and second bandpass filters having matched phase response characteristics for respectively applying said input signals and said second output to said first mixer, (f) phase detector means responsive to said first output and said reference signal for providing an error signal, and (g) a loop filter connected to the output of said phase detector which passes a frequency band substantially narrower than the frequency bandpass of said first and second bandpass filters for applying said error signal to said variable frequency oscillator.

2. The invention as set forth in claim 1, wherein (a) said second bandpass filter passes the sum frequency product of said second mixer, and wherein (b) a third bandpass filter for passing the difference product of said first mixer is connected between said first mixer and said phase detector.

3. The invention as set forth in claim 1, wherein said first and second filters passbands are approximately equal to said frequency shift and are of multi-pole Butterworth configuration.

4. The invention as set forth in claim 3, wherein said poles are equal to five.

5. The invention as set forth in claim 3, wherein the slope of the phase vs. frequency characteristics of said first and second filters over their passbands are equal.

6. The invention as set forth in claim 1, wherein another phase detector is provided together with (a) means for applying said reference signal shifted in phase 90° to said other phase detector, (b) means for applying said first output to said other phase detector, (c) a sweep voltage generator, and (d) switch means responsive to said other phase detector output for alternatively connecting said sweep voltage generator and said error signal to said variable frequency oscillator.

7. The invention as set forth in claim 1, including (a) phase detector means for demodulating said input signal, (b) means for applying said input signal to said phase demodulator means, and (c) means for applying said output signal to said phase demodulator means.

8. The invention as set forth in claim 7, wherein said output signal applying means includes a bandpass filter tuned to the same frequency as said first filter and having an adjustable passband.

9. A signal tracking system for tracking and producing an output signal which is phase coherent with an input signal, said system comprising a phase locked loop including (a) means for producing as said output signal a signal which is adapted to be varied in frequency and phase as a function of an error signal applied thereto, (b) phase detector means for producing said error signal, (c) means for generating and applying a reference signal to said phase detector means, and (d) means for generating and applying a control signal to said phase detector means which comprises (i) first and second frequency translation means, (ii) means for applying said output signal and said reference signal to said second frequency translation means, (iii) first and second bandpass filters having matched phase response characteristics over like passbands for respectively applying said input signal and the output of said second frequency translation means to said first frequency translation means, and (iv) means for deriving said control signal from said first frequency translation means.

References Cited

UNITED STATES PATENTS

| | | | |
|---|---|---|---|
| 3,007,044 | 10/1961 | Cookson | 325—419 |
| 3,032,650 | 5/1962 | Mathison | 325—412 |

KATHLEEN H. CLAFFY, Primary Examiner

D. L. RAY, Assistant Examiner

U.S. Cl. X.R.

325—419